June 15, 1926.

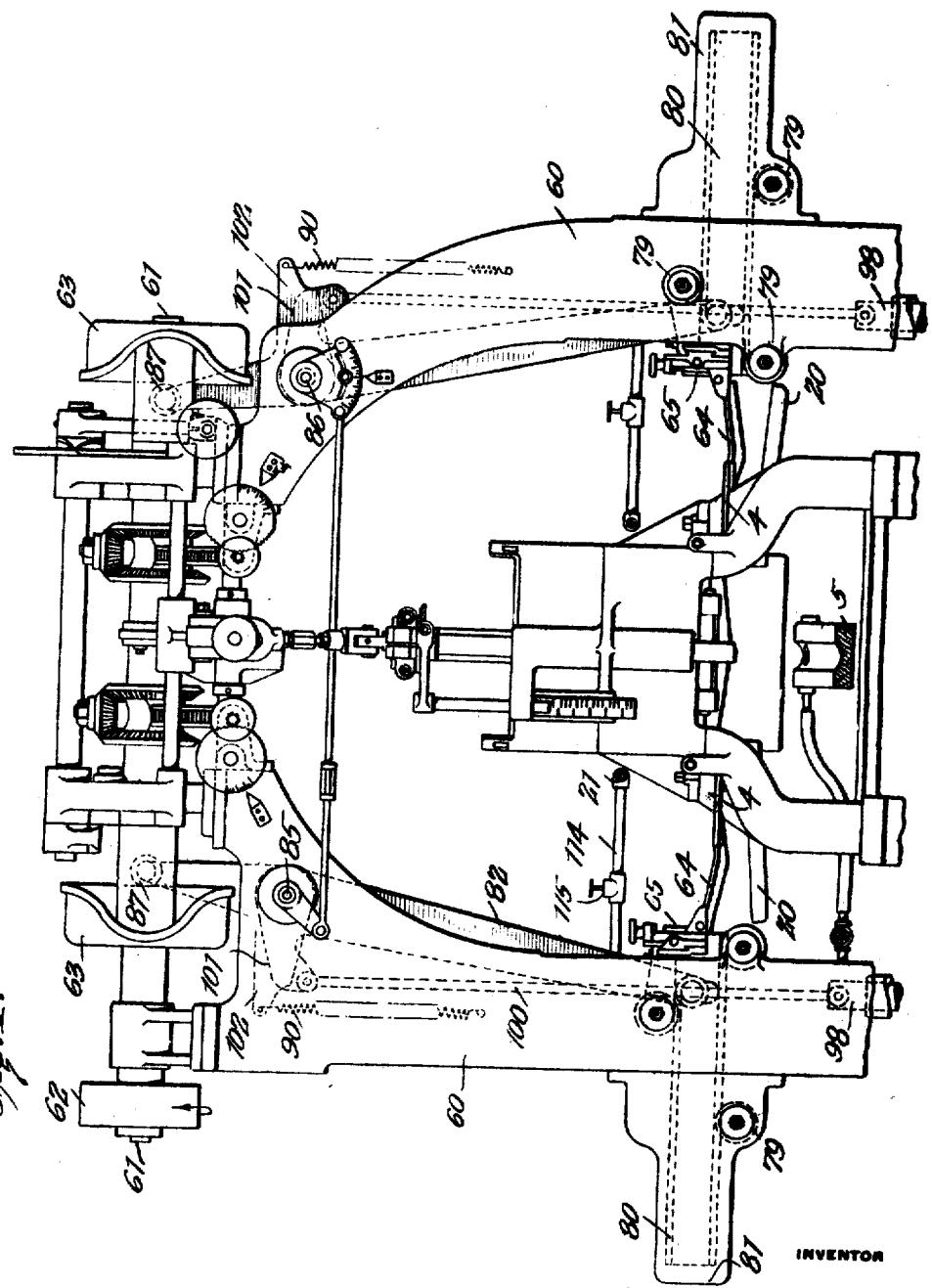

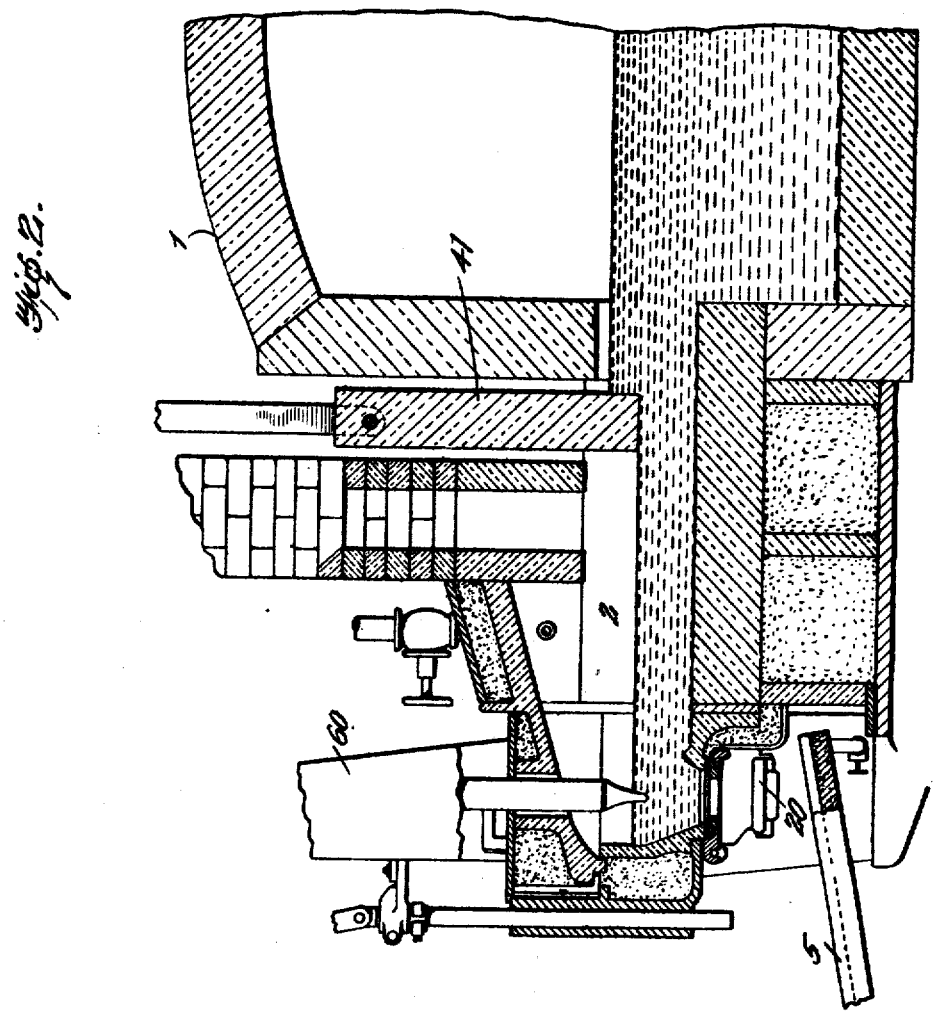

K. E. PEILER 1,589,304

FEEDING MOLTEN GLASS

Filed Dec. 8, 1925　　6 Sheets-Sheet 3

Inventor
KARL E. PEILER,

By Robrow A Brown

Attorney

June 15, 1926. 1,589,304
K. E. PEILER
FEEDING MOLTEN GLASS
Filed Dec. 8, 1925 6 Sheets-Sheet 4
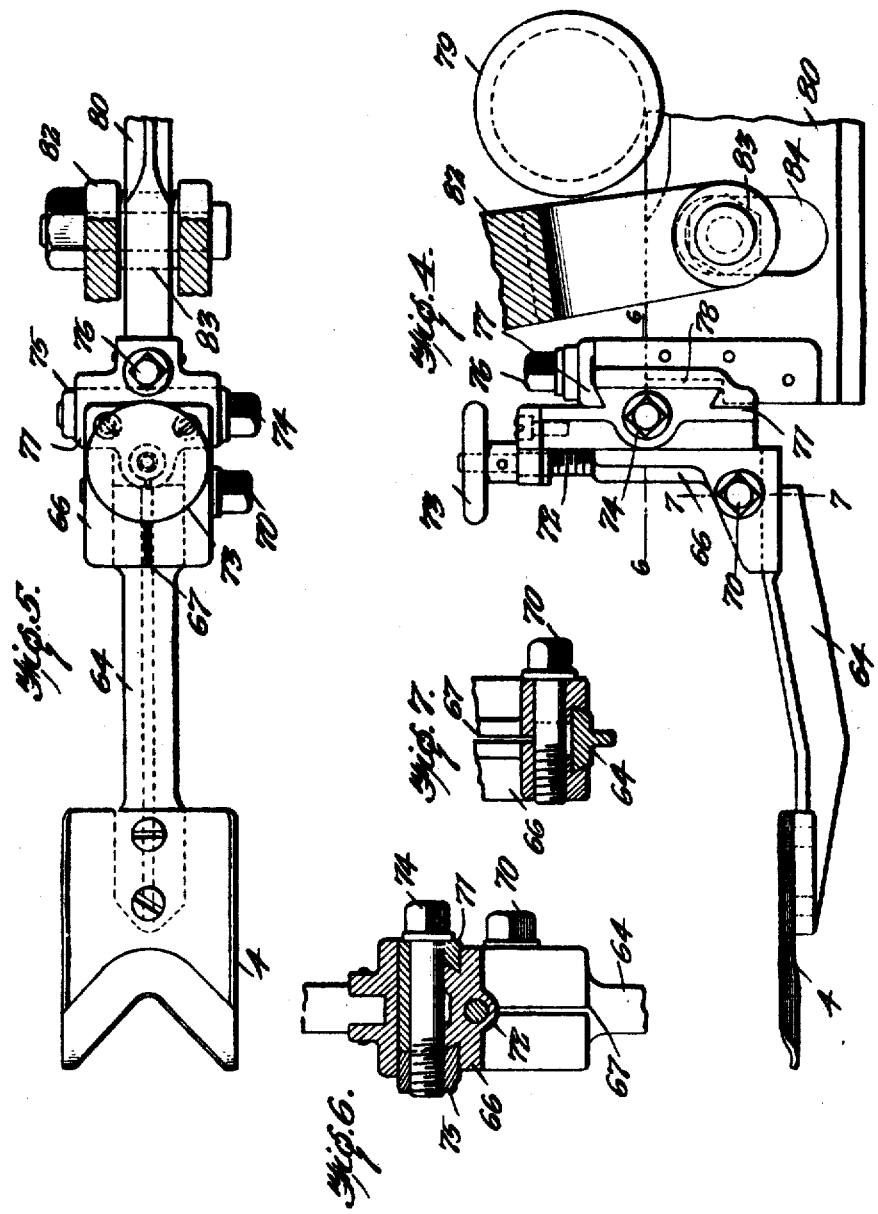
INVENTOR
KARL E. PEILER
By Robson D. Brown
ATTORNEY June 15, 1926.
K. E. PEILER
1,589,304
FEEDING MOLTEN GLASS
Filed Dec. 8, 1925   6 Sheets-Sheet 5
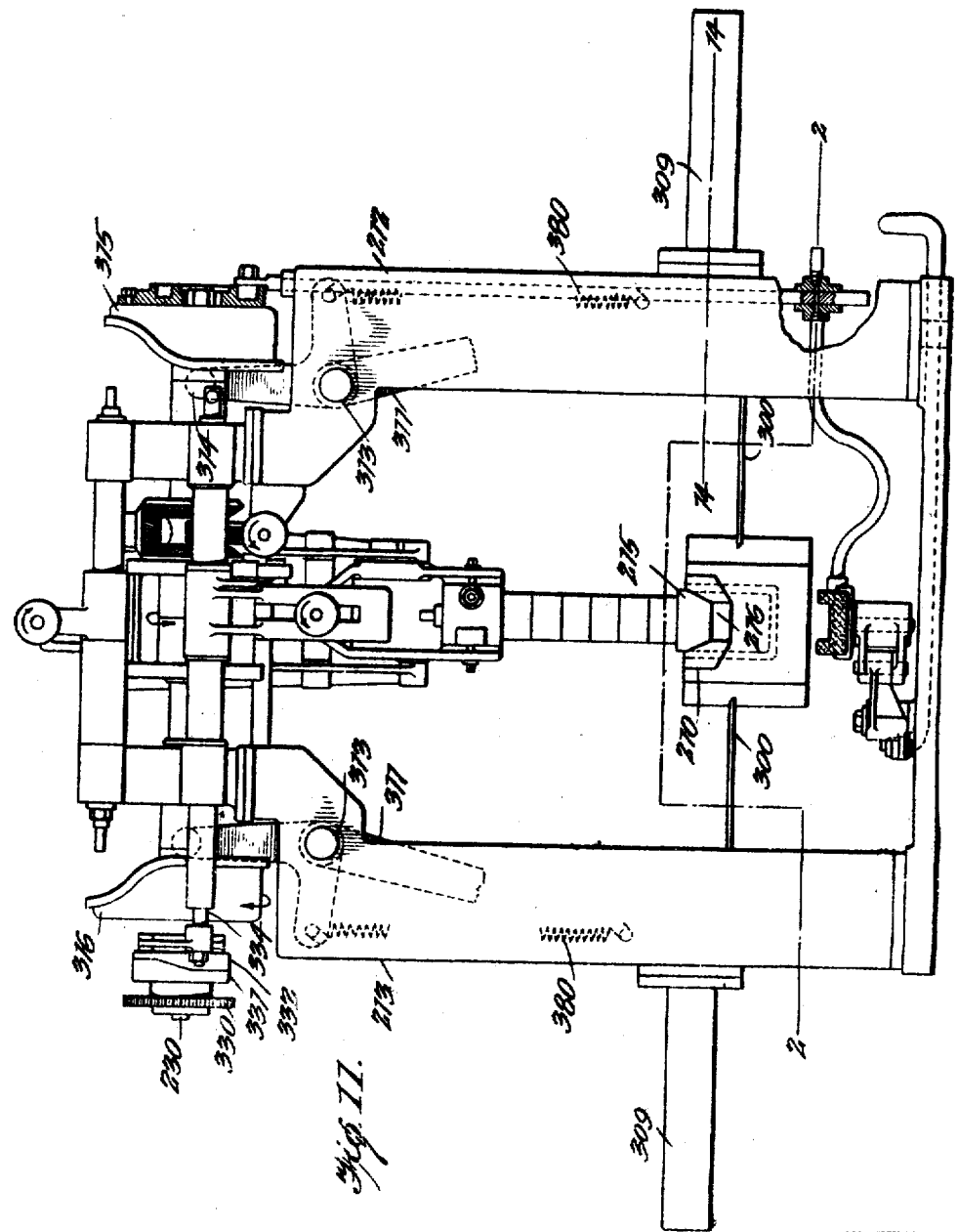
INVENTOR
KARL E. PEILER,
By Robert K Brown
ATTORNEY

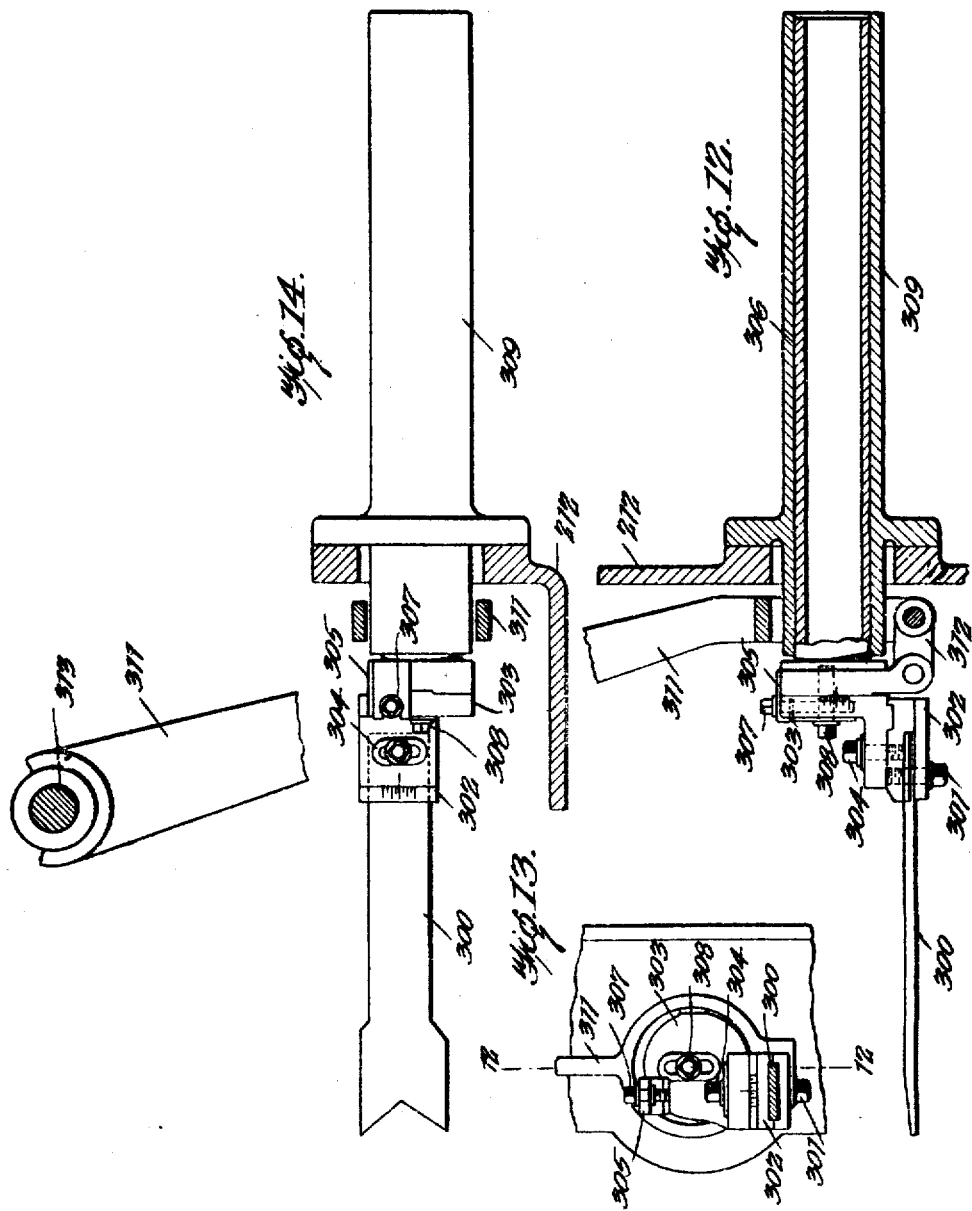

Patented June 15, 1926.

1,589,304

UNITED STATES PATENT OFFICE.

KARL E. PEILER, OF WEST HARTFORD, CONNECTICUT, ASSIGNOR TO HARTFORD-EMPIRE COMPANY, A CORPORATION OF DELAWARE.

FEEDING MOLTEN GLASS.

Application filed December 8, 1925. Serial No. 74,035.

This invention relates to the separation of molten glass into mold charges. It is concerned particularly with the shears which are usually employed for separating the mold charges in regular succession from the supply body of molten glass.

One object of this invention is to provide a method and suitable means for influencing the shape of mold charges which are preformed while being discharged in suspension from a supply of molten glass in a container, by varying the vertical position of the shears and, consequently, varying the height of the severing plane.

Another object of this invention is to provide useful adjustments for glass shears of the kind referred to above, whereby the relative positions of the shear blades, and their vertical and lateral position in respect to the glass outlet, may be adjusted to suit changing requirements.

This application is a continuation in part of my copending application filed May 5, 1919, Serial No. 294,792, and is also a continuation in part of my copending application filed March 28, 1917, Serial No. 157,943, which is itself a continuation of my prior application filed August 13, 1914, Serial No. 856,548.

It is a prominent characteristic of molten glass, that when it issues or is withdrawn from the furnace or container, and is exposed to the colder surroundings outside of the furnace, it acquires a partially chilled surface or skin, known in this art as "enamel". This enamel is coldest and stiffest on its outer surface, and gradually merges into the hot and more plastic interior of the glass. When a charge of this glass is delivered to a mold, any undue stretching, rupture, or infolding of the enamel will cause defects in the article being made. Any trapping of air by the glass, due to lapping or folding of the surface of the glass as it is delivered to the molds, will also cause defects. To avoid these defects it is desirable to perform the mold charge, before it enters the mold, so that its external contour will closely approximate the interior contour of the mold walls, or at least that portion of the mold which receives the gather. This is of special importance in the making of blown glassware. A mold charge which is to form a narrow necked bottle, for example, should be preformed as an elongated cylinder with a tapering end, so that its entire surface may as nearly as possible contact equally with the mold walls for the same length of time. Unequal contact of different portions of the surface, or unequal duration of contact of the different portions, tends to produce an unsymmetrically chilled and enameled blank or parison, which will not blow out uniformly, because the hotter portions will stretch more than the cooler portions, resulting in a poor bottle having a wall of uneven thickness.

These conditions have evidently been recognized to some extent by the hand gatherer, practicing his ancient art, who by manipulation of his punty or gathering rod during the gathering operation preformed his gather or mold charge, as well as he could by this primitive method, to fit the mold, or that portion of the mold that receives the gather, thus attempting to avoid undue deformation of the mold charge when deposited in the mold. On the other hand, these conditions have received little or no attention in the gathering or feeding of molten glass as practiced by machine or other automatic methods prior to my invention of the apparatus set forth in my original applications identified above.

The mechanisms shown in the original applications, of which the present application is a continuation in part, accomplish this preliminary shaping of mold charges with greater ease and exactness than heretofore, by the adjustable operation of suitable impelling means coacting with a discharge orifice below which the mold charges are accumulated and suspended, and these mechanisms employ the elongation of the suspended charges in controlling their shape. They also make use of coaction between the impelling means and suitable severing means, convenient adjustments being provided to allow control of the severing means and the impelling means as to relative time of operation and position.

The present application is filed for the purpose of claiming these adjustments features so far as they relate particularly to the shears.

Certain of these shear adjustments, like the various impeller adjustments disclosed in my original applications, may be made while the apparatus is operating, that is, these adjustments may be made, to control and vary the shape of the glass gathers and mold charges, without stopping the machine, thus allowing the maintenance of the flow of glass and the uniform heat conditions which are so essential in proper operation of glass feeding apparatus. Stopping of the machine to make adjustments would stop the flow of glass and would have the effect of allowing the glass to chill near the outlet and of changing the heat conditions. As a result, the operating conditions would be changed so that the immediate effect of the adjustments could not be observed and employed as a guide in making these adjustments. In the present invention, on the other hand, the shear adjustments which affect the glass delivery may be made while the apparatus is operating, so that the progressive effect of these adjustments may be observed while they are being made, thus giving better control of the operation.

In the accompanying drawings:

Figure 1 is a general front elevation of the machine shown in my prior application, Serial No. 294,792, with the lower or base part omitted.

Fig. 2 is a partial longitudinal sectional view of the same apparatus, the section being taken centrally through the glass discharge outlet.

Fig. 4 is a front view of the right hand shear carrier and blade.

Fig. 5 is a plan view of the parts shown in Fig. 3.

Fig. 6 is a fragmentary view partly in plan and partly in horizontal section on the line 10—10, Fig. 4.

Fig. 7 is a fragmentary end elevation, with parts in section on the line 11—11, Fig. 4.

Fig. 11 is a front elevational view in reduced scale, showing the general features of the machine shown in my prior application, Serial No. 157,943.

Fig. 12 is a front elevational view of a portion of the shear mechanism of the same prior application.

Fig. 13 is an end elevation projected from Fig. 12, and

Fig. 14 is a plan view projected from Fig. 12.

Figure 8:
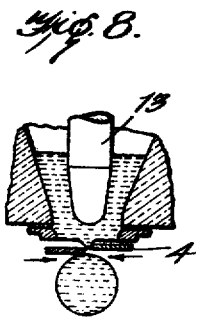
Figs. 8, 9 and 10 are diagrammatic views illustrating the employment of shear-height adjustment in producing mold charges of certain shapes.
Figure 9:
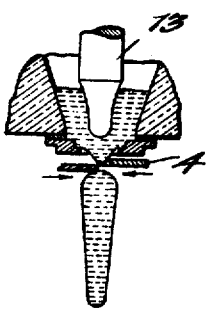
Figure 10:
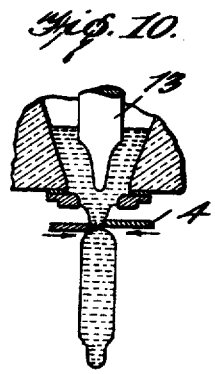

Referring first to Figs. 1 to 10, the invention is shown embodied in a machine having the necessary mechanical movements and adjustments, and cooperating with a conduit projecting from a glass furnace, from which the molten glass is thus delivered in mold charges to an associated molding or shaping machine.

The molten glass flows from the glass furnace 1 through a channel or conduit 2 (Fig. 2) to an outlet 3. It is there acted upon by an impeller 13 mounted for vertical movement, and provided with various adjustments. As it issues periodically in regular cycles from the outlet, it forms successive gathers from which mold charges are severed by shear blades 4 reciprocating below the outlet. The separated mold charges fall upon a moistened chute 5 and slide upon it to molds mounted on the table of the associated shaping machine.

The mechanisms by which the impeller 13 is mounted, driven and adjusted are not described in detail herein, since this application is chiefly concerned with the shear mechanism. It is sufficient to state that the shears are closed once for each reciprocation of the impeller, to sever a mold charge from the discharged glass.

The frame of the machine is carried by the base 58 (Fig. 3) and surrounds the channel and spout. The base carries columns 60 with suitable bearings at their upper ends to carry the drive shaft 61 and pivot shafts. The drive shaft may be driven by a pulley 62 (Fig. 1) as shown, and may be connected to a shaping machine by any suitable means for synchronizing its operations with those of this machine. The shaft 61 carries cams 63 for driving the shears and serves as a pivot for the impeller cams.

The shear blades 4 are notched as shown in Fig. 5. This allows them to enclose the glass and to constrict it on all sides as well as to cut it. For this reason they act to separate the glass partly by constriction and partly by cutting, thereby minimizing the shear mark on the severed glass.

The shear blades 4 are fastened to shanks 64 which are carried in adjustable heads or holders 65 (Figs. 4, 5, 6 and 7, which show the right hand holder), by means of which the blades may be adjusted up, down and sidewise relatively to each other and to the outlet 3, so as to sever the glass at the desired position and to operate to the best advantage. The shank 64 of each blade is removably held in a vertical slide 66 split in its lower portion at 67 (Figs. 6 and 7) and clamped by means of the clamp screws 70. The vertical slide 66 fits a guideway on a cross slide 71 as shown in Fig. 6 and may be adjusted up and down by means of the adjusting screw 72 by its hand wheel 73. The slide 66 may be clamped in place in its guideway by the screw 74 and clamp 75. The cross slide 71, which carries the vertical slide and its adjustment, fits in a guideway 78 (Fig. 4) and may be clamped in place by the screw 76 and clamp 77, thus allowing the shear blades to be adjusted for transverse position and clamped to place. The shear blades may be adjusted endwise by moving their shanks in and out in their holders, either for the proper initial setting or for a controlling adjustment, although a preferable operating adjustment is provided for this purpose. In this way the shear blades may be moved in three directions so as to bring them into proper relationship to the outlet and proper alignment with each other. To move the severing plane to a higher or lower level, both shear blades are adjusted up or down as desired, the proper cutting alignment between them being maintained by turning both hand wheels 73 the same amount.

The shear holders above described are carried on the ends of the carriers 80 guided between grooved guide rollers 79 pivoted on the columns 60, and are protected by the guards 81 projecting from these columns. The carriers 80 are moved toward and away from each other by means of levers 82 carrying at their lower ends rollers 93 which engage with slots 84 in the carriers. The shear levers are pivotally mounted on studs 85 and 86 carried on the columns 60. The upper ends of the shear levers are provided with cam rollers 87 which are held by suitable springs 90 against the shear cams 63 which are fixed on the main shaft 61, the cams being shaped to move the shear blades to and from each other to cut off the successive mold charges when formed.

Figure 3:
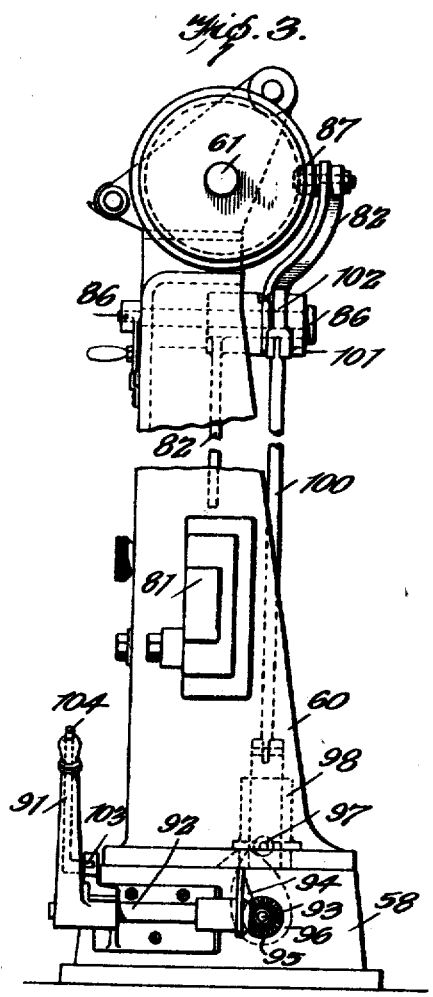
Fig. 3 is a side elevation, showing some of the shear mechanism.

The shears may be stopped in their retracted positions without stopping the rest of the machine by moving the hand lever 91 to the position shown in Figs. 3, 4 and 5. This rocks the shaft 92 and transmits the motion to shaft 93 by means of bevel sector 94 and bevel gear 95. This shaft carries two cams 96 against which bear the rollers 97 carried by the slides 98 so that the rocking of the shaft 93 raises or lowers them. These slides are connected by means of connecting rods 100 with the arms 101 which are pivoted on the studs 85 and 86 with the shear levers 82. These arms bear against the lower side of the shear lever extensions 102. In this way the shear levers may be positively held against the action of the springs 90 to hold the shears inactive in their retracted positions while the cams continue to rotate. By reversing the position of the hand lever 91, the arms 101 will be swung down and the shears will be allowed to resume normal operation. The hand lever 91 may be locked in position by means of the latch 103 worked by a knob 104.

The shear blades are cooled between successive severing operations by means of water sprays 21 (Fig. 1), supplied by pipes 114 and regulated by valves 115. The water from the sprays strikes the blades in their retracted positions and is finally caught by the drain pans 20 from which the water is drained away.

The impeller 13 may be held inactive at lower positions projecting into the glass at the outlet, or even through the outlet. By thus holding the impeller inactive at its lower positions and adjacent the outlet, the gravity outflow of the glass can be timed and shaped for various forms of gathers by operating the severing means only.

In operation, the gate 41 is raised to the proper point to maintain the desired head of glass over the outlet and the machine is set in motion, reciprocating the impeller and the shears. The molten glass issues from the outlet under the combined influence of gravity and the action of the impeller, which times and controls its accumulation in gathers which are successively suspended from the outlet ring and from the impeller end. For each complete reciprocation of the impeller there is a reciprocation of the shears which sever a mold charge from each suspended gather. After each severing operation the freshly cut end or stub remaining below the outlet, and forming the lower end of the succeeding gather, is moved upwardly, or its downward movement is retarded, by the action of the impeller.

By raising or lowering the shears they may be made to sever the glass at a higher or lower level, leaving a shorter or longer stub respectively. This length of stub has an influence on the length of the gather. A longer stub tends to elongate the gather and a shorter stub tends to produce a shorter gather. This influence extends to the lower part of the gather especially.

My original application, Serial No. 294,792, illustrates and describes several specific mold-charge shapes, in the production of which advantage is taken of this variation in the height of the shears. Thus when very short spheroidal charges are desired, the shears are set as close to the container outlet as is practicable, so as to produce a short blunt stub above the shears. This is illustrated in Fig. 8 of the accompanying drawing. When a longer and more slender charge is to be made, such as that shown in Fig. 9, the shears are set lower, and a longer stub is therefore left above the shears. In producing the mold charge illustrated in Fig. 10, the shears are set still lower, to produce a still longer stub.

In producing any particular mold-charge shape, I usually employ not only this shear-height adjustment, but also some or all of the various other adjustments, of the impeller, of the shear speed, and of other associated elements, which are described and claimed in my original application, Serial No. 294,792 or in other divisions thereof.

Figs. 11 to 14 show the manner in which the adjustment of the height and position of glass-severing shears is embodied in the apparatus shown in my other application Serial No. 157,943, of which the present application is a continuation in part.

The glass feeding machine therein shown is intended and adapted to be mounted between a glass tank or furnace and a glass shaping machine, the glass being taken from a projecting spout or conduit 210 of any suitable furnace, and delivered in separated gathers or mold charges, to an associated machine for blowing or pressing or otherwise shaping the glass into commercial form, the delivering being made directly from the conduit into the shaping molds of the associated machine, or along a trough or chute to those molds, as may be found desirable The molten glass flowing from the furnace along the spout or conduit 210 is swept in successive waves of suitable size for forming the desired gathers by means of the paddle or displacer 215, which is moved forward and back in the glass longitudinally of the conduit, thus propagating successive waves of glass, which fall or surge forward through the outlet gap 216 in the end wall of the conduit. The extrusion of each surge or wave of glass from the conduit and its separation to form a charge or gather are definitely completed by the movements of the paddle at the forward end of its stroke, aided by suitable shear mechanism.

The paddle is suspended for horizontal swinging movement and may be raised and lowered during its horizontal swinging movement, these movements being produced by suitable cams as described in the original application, and these cams being adjustable to vary the time and amplitude of the several components of the paddle stroke.

As the succeeding waves of glass emerge from the outlet 216, they sag or settle down on the end of the trough or conduit, taking a more or less pear shaped form, and are severed at regular intervals by means of shear mechanism operated by this machine in suitable time relation to the other mechanisms. The shear blades 300 are carried in adjustable heads or holders (Figs. 12, 13 and 14) by means of which the blades are adjusted up, down, and sidewise, relative to each other and to the conduit, so as to sever the gathers at the desired position and to the best advantage. The shanks or stems of the shear blades 300 are removably clamped by bolts 301 to cross slides 302, which are fitted to slide crosswise of the vertical slides 303, being clamped in position by means of screws 304. The vertical slides 303 are mounted for vertical sliding movement on the heads 305 of the slides 306, being adjusted vertically by means of the screws 307 and clamped to place by the screws 308. The shear slides 306 are fitted for sliding movement in the housings or casings 309, which substantially enclose the slides to protect them from dirt and pieces of glass. The casings 309 are mounted substantially opposite to each other on the columns 212 and 213, as shown in Fig. 11, and the shear slides are moved toward and away from each other by means of levers 311, which connect with the slides 306 by means of links 312. The shear levers 311 are pivotally mounted on studs 313 fixed in the columns 212 and 213. The upper ends of the shear levers are provided with studs having anti-friction rolls 314 which are held by suitable springs 380 against the the shear cams 315 and 316 fixed upon the main shaft 230, the cams being shaped and timed to bring the shear blades 300 together and cut off the successive drops or gathers at the proper times relative to the other mechanisms.

The machine may be driven in any convenient way from any available source of power, or from an associated shaping machine. It is herein shown to be provided with a driving gear 330 (Fig. 1) carrying the driving member 331 of a clutch, both turning loosely upon the main shaft 230. The driven member 332 of the clutch is keyed or splined to the main shaft, to permit it to be moved endwise thereon, and is so moved by a clutch fork 333 carried by a clutch rod 334, which is so mounted as to be within the reach of the operator. In the present instance, the clutch rod 334 extends axially through the pivot shaft 249 and has upon its opposite end an operating handle 335, by means of which the clutch is closed and opened to start and stop the machine.

The structural details herein shown may be varied in many respects without departing from my invention as defined in the appended claims.

I claim as the invention to be protected by this continuation of my application identified above:

1. Glass gathering apparatus, comprising a receptacle for molten glass, means for delivering formed lumps of viscous glass therefrom, and knives for severing each lump as formed, said knives being adjustable along the path of delivery of such lumps.

2. Glass severing apparatus comprising two movable shear carriers, a common driving means for moving said carriers toward and from each other, a shear blade carried by each of said carriers, and means for adjusting each blade vertically relative to its carrier.

3. Glass severing apparatus comprising two movable shear carriers, a common driving means for moving said carriers horizontally toward and from each other, a shear blade carried by each of said carriers, means for adjusting each blade vertically relative to its carrier and means for adjusting each blade horizontally relative to its carrier.

Signed at Hartford, Conn., this 25th day of November, 1925.

KARL E. PEILER.

two movable shear carriers, a common driving means for moving said carriers toward and from each other, a shear blade carried by each of said carriers, and means for adjusting each blade vertically relative to its carrier.

3. Glass severing apparatus comprising two movable shear carriers, a common driving means for moving said carriers horizontally toward and from each other, a shear blade carried by each of said carriers, means for adjusting each blade vertically relative to its carrier and means for adjusting each blade horizontally relative to its carrier.

Signed at Hartford, Conn., this 25th day of November, 1925.

KARL E. PEILER.

DISCLAIMER.

1,589,304.—*Karl E. Peiler*, West Hartford, Conn. FEEDING MOLTEN GLASS. Patent dated June 15, 1926. Disclaimer filed June 11, 1929, by the assignee, *Hartford-Empire Company*, and ratified by the patentee, said *Karl E. Peiler*.

Hereby enters this disclaimer to that part of the claim in said specification which is in the following words, to wit:

"1. Glass gathering apparatus, comprising a receptacle for molten glass, means for delivering formed lumps of viscous glass therefrom, and knives for severing each lump as formed, said knives being adjustable along the path of delivery of such lumps."

Except when said claim 1 is limited as follows:

1. When the clause in said claim reading "means for delivering formed lumps of viscous glass" is limited to means for causing a periodic, pulsating discharge of such glass at regular intervals to form a regular succession of similar, preformed and suspended masses of glass; and
2. When the "knives" referred to in said claim are limited to knives which approach the suspended glass from opposite sides at regular intervals and coact with each other in suitable timed relation to said delivering means to sever mold charges in suspension and to control, by their vertical position, the length of the stub of glass remaining above the knives after severance, thus influencing the length of the mold charges so delivered in regular succession.

[*Official Gazette July 2, 1929.*]

DISCLAIMER 1,589,304.—*Karl E. Peiler*, West Hartford, Conn. FEEDING MOLTEN GLASS. Patent dated June 15, 1926. Disclaimer filed November 3, 1932, by the assignee, *Hartford-Empire Company*, and ratified by the patentee, said *Peiler*.

Hereby disclaims claim 1 of said Letters Patent.

[*Official Gazette November 22, 1932.*]

DISCLAIMER.

1,589,304.—*Karl E. Peiler*, West Hartford, Conn. FEEDING MOLTEN GLASS. Patent dated June 15, 1926. Disclaimer filed June 11, 1929, by the assignee, *Hartford-Empire Company*, and ratified by the patentee, said *Karl E. Peiler*.

Hereby enters this disclaimer to that part of the claim in said specification which is in the following words, to wit:

"1. Glass gathering apparatus, comprising a receptacle for molten glass, means for delivering formed lumps of viscous glass therefrom, and knives for severing each lump as formed, said knives being adjustable along the path of delivery of such lumps."

Except when said claim 1 is limited as follows:

1. When the clause in said claim reading "means for delivering formed lumps of viscous glass" is limited to means for causing a periodic, pulsating discharge of such glass at regular intervals to form a regular succession of similar, preformed and suspended masses of glass; and 2. When the "knives" referred to in said claim are limited to knives which approach the suspended glass from opposite sides at regular intervals and coact with each other in suitable timed relation to said delivering means to sever mold charges in suspension and to control, by their vertical position, the length of the stub of glass remaining above the knives after severance, thus influencing the length of the mold charges so delivered in regular succession.

[*Official Gazette July 2, 1929.*]

DISCLAIMER 1,589,304.—*Karl E. Peiler*, West Hartford, Conn. FEEDING MOLTEN GLASS.
Patent dated June 15, 1926. Disclaimer filed November 3, 1932, by the assignee, *Hartford-Empire Company*, and ratified by the patentee, said *Peiler*.
Hereby disclaims claim 1 of said Letters Patent.
[*Official Gazette November 22, 1932.*]